United States Patent
Contreras (10) Patent No.: US 11,236,582 B2
(45) Date of Patent: *Feb. 1, 2022

(54) WELLBORE CEMENT HAVING POLYMER CAPSULE SHELLS

(71) Applicant: Saudi Arabian Oil Company, Dhahran (SA)

(72) Inventor: Elizabeth Q. Contreras, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/133,219

(22) Filed: Sep. 17, 2018

(65) Prior Publication Data

US 2019/0016941 A1    Jan. 17, 2019

Related U.S. Application Data

(63) Continuation of application No. 15/914,056, filed on Mar. 7, 2018, now Pat. No. 10,513,905.
(Continued)

(51) Int. Cl.
*E21B 33/14* (2006.01)
*C09K 8/467* (2006.01)
(Continued)

(52) U.S. Cl.
CPC .......... *E21B 33/14* (2013.01); *C04B 20/1037* (2013.01); *C04B 24/24* (2013.01);
(Continued)

(58) Field of Classification Search
None
See application file for complete search history.

(56) References Cited

U.S. PATENT DOCUMENTS 3,429,827 A    2/1969   Ruus
3,577,515 A *  5/1971   Vandegaer ............. A01N 25/28
                                                  424/497

(Continued)

FOREIGN PATENT DOCUMENTS

CN     105254226 A      1/2016
WO    2006061561 A1    6/2006
(Continued)

OTHER PUBLICATIONS

International Search Report and Written Opinion for related PCT application PCT/US2018/021268 dated Sep. 12, 2018.
(Continued)

*Primary Examiner* — Anuradha Ahuja
(74) *Attorney, Agent, or Firm* — Bracewell LLP; Constance Gall Rhebergen (57) ABSTRACT

Capsules with a cement additive covered by a polymeric outer shell are added to wellbore cement. The additive is released from the shells by osmosis or shell ruptures. Capillary forces draw the additive into micro-annuli or cracks present in the cement, where the additive seals the micro-annuli and cracks to define a self-sealing material. The empty shells remain in the cement and act as an additive that modifies cement elasticity. The capsules are formed by combining immiscible liquids, where one of the liquids contains a signaling substance, and each of the liquids contains a reagent. When combined, the liquids segregate into a dispersed phase and a continuous phase, with the dispersed phase having the signaling agent. The reagents react at interfaces between dispersed and continuous phases and form polymer layers encapsulating the signaling agent to form the capsules. Adjusting relative concentrations of the reagents varies membrane strength and permeability.

13 Claims, 5 Drawing Sheets

Related U.S. Application Data (60) Provisional application No. 62/468,068, filed on Mar. 7, 2017.

(51) Int. Cl.
  | | |
  |---|---|
  | *C04B 24/24* | (2006.01) |
  | *C04B 28/04* | (2006.01) |
  | *C04B 20/10* | (2006.01) |
  | *E21B 47/005* | (2012.01) |
  | *C04B 24/28* | (2006.01) |
  | *C04B 103/00* | (2006.01) |
  | *C04B 111/50* | (2006.01) |

(52) U.S. Cl.
  CPC ............ *C04B 24/287* (2013.01); *C04B 28/04* (2013.01); *C09K 8/467* (2013.01); *E21B 47/005* (2020.05); *C04B 2103/0058* (2013.01); *C04B 2111/503* (2013.01)

(56) References Cited

U.S. PATENT DOCUMENTS

| | | | | |
|---|---|---|---|---|
| 3,835,317 | A * | 9/1974 | Vann | E21B 47/0005 |
| | | | | 250/260 |
| 4,986,354 | A * | 1/1991 | Cantu | C09K 8/516 |
| | | | | 166/279 |
| 5,001,342 | A * | 3/1991 | Rambow | E21B 47/0005 |
| | | | | 250/259 |
| 6,527,051 | B1 | 3/2003 | Reddy et al. | |
| 6,554,071 | B1 | 4/2003 | Reddy et al. | |
| 6,780,507 | B2 | 8/2004 | Toreki et al. | |
| 8,047,282 | B2 | 11/2011 | Lewis et al. | |
| 8,143,198 | B2 | 3/2012 | Lewis et al. | |
| 8,240,386 | B2 | 8/2012 | Mackay | |
| 8,469,095 | B2 | 6/2013 | Le Roy-Delage et al. | |
| 9,416,619 | B2 | 8/2016 | Aines et al. | |
| 2004/0171499 | A1 | 9/2004 | Ravi et al. | |
| 2010/0307745 | A1 * | 12/2010 | Lafitte | C09K 8/62 |
| | | | | 166/250.12 |
| 2011/0048711 | A1 | 3/2011 | Lewis et al. | |
| 2011/0054068 | A1 | 3/2011 | Lewis et al. | |
| 2011/0108241 | A1 | 5/2011 | Driscoll et al. | |
| 2011/0120733 | A1 | 5/2011 | Vaidya et al. | |
| 2014/0239164 | A1 * | 8/2014 | Rothrock | G01N 21/534 |
| | | | | 250/227.11 |
| 2014/0305646 | A1 * | 10/2014 | Chew | C08L 23/18 |
| | | | | 166/305.1 |
| 2016/0040502 | A1 * | 2/2016 | Robben | E21B 33/14 |
| | | | | 166/285 |
| 2017/0349805 | A1 * | 12/2017 | Musso | C09K 8/467 |
| 2019/0048250 | A1 * | 2/2019 | Droger | C04B 20/1029 |

FOREIGN PATENT DOCUMENTS

| | | | | |
|---|---|---|---|---|
| WO | WO 2010140032 | * | 12/2010 | ............ E21B 47/10 |
| WO | 2014102386 A1 | | 7/2014 | |
| WO | WO 2017137789 | * | 8/2017 | ............ C04B 22/00 |

OTHER PUBLICATIONS

Song, Y. et al., "Recent progress in interfacial polymerization", The Royal Society of Chemistry and the Chinese Chemical Society; Materials Chemistry Frontiers, 2017, vol. 1, pp. 1028-1040.

Broadwater, S., et al.; "One-Pot Multi-Step Synthesis: A Challenge Spawning Innovation", Organic Biomolecular Chemistry; vol. 3, pp. 2899-2906; published Jul. 20, 2005.

Partial International Search Report and Written Opinion, PCT/US2018/021268 dated Jun. 26, 2018.

Quevedo E., et al.; "Interfacial Polymerization Within a Simplified Microfluidic Device: Capturing Capsules." Journal of the American Chemical Society, May 7, 2005.

Steinbacher, JL; "Polymer Chemistry in Flow: New Polymers, Beads, Capsules and Fibers." Journal of Polymer Science Part A: Polymer Chemistry, Jun. 15, 2006.

Tadros, T.; "Polymeric Surfactants in Disperse Systems"; Advances in Colloid and Interface Science; vol. 147-148; pp. 281-299; published Nov. 5, 2008.

1st Office Action dated Mar. 19, 2021, in the prosecution of Chinese patent application No. 2018800165104 and English partial translation thereof, 13 pages.

* cited by examiner

WELLBORE CEMENT HAVING POLYMER CAPSULE SHELLS

CROSS-REFERENCE TO RELATED APPLICATION

This application claims priority from co-pending U.S. patent application Ser. No. 15/914,056, filed Mar. 7, 2018, and which claimed priority from U.S. Provisional Application Ser. No. 62/468,068 filed Mar. 7, 2017, the full disclosures of which are incorporated by reference in their entireties and for all purposes.

BACKGROUND

1. Field of the Disclosure

The present disclosure relates to wellbore cement having polymer capsule shells. More specifically, the present disclosure relates to wellbore cement having polymer shells of spent or ruptured capsules.

2. Description of Prior Art

Hydrocarbons that are produced from subterranean formations typically flow from the formation to surface via wellbores that are drilled from surface and intersect the formation, where the wellbores are often lined with tubular casing. The casing is usually bonded to the inner surface of the wellbore with a cement that is injected into an annulus that is between the casing and wellbore. In addition to anchoring the casing within the wellbore, the cement also isolates adjacent zones within the formation from one another. Over time, thermal-mechanical stresses downhole can cause even a successful cementing operation to fail in tension or compression, or to debond from the casing or formation creating microannuli. Without the cement isolating these adjacent zones, gaseous formation fluids communicate through cracks and microannuli and cause pressure buildup behind the casing which is detrimental to production and safety, for example, which can lead to a reduction in the hydrocarbon producing potential of the wellbore. Proper well construction provides ground water protection. Loss of zonal isolation from poor cement may allow fresh water to travel along the casing and contaminate salt bearing formations, dissolving upper salt layers, which can lead to a loss of the well, for example.

The cement also blocks hydrocarbon fluid flow in the annulus between the casing and the wellbore wall. Without the cement, or in instances when cement has failed, hydrocarbon from the formation are known to migrate to surface. Gas migration is often a greater issue in deep wells, where drilling fluid densities often as high as 22 pounds per gallon are used to control gas or formation fluid influx. To control gas migration, cement densities for successfully cementing of the zone of interest are sometimes as high as 22.7 pounds per gallon, which also allows the displacement of previous drilling fluids during cementing operations. As a cement slurry sets, hydrostatic pressure is reduced on the formation. During this transition, reservoir gases can travel up through the cement column resulting in gas being present at the surface. The permeable channels from which the gas flows cause operational and safety problems at the well site. Causes of gas channeling include: (1) bad mud/spacer/cement design that allows passage of water and gas resulting in failures in cementing operations; (2) high fluid loss from cement slurries, which causes water accumulation and results in micro-fractures within the cement body; and (3) cements not providing sufficient hydrostatic pressure to control the high pressure formation.

SUMMARY

An example method of wellbore operations includes injecting a slurry into the wellbore, the slurry including a cement and capsules, the capsules made up of an encapsulant encased within polymeric shell, placing the slurry into an annular space between a sidewall of the wellbore and a tubular in the wellbore to create a set cement in the wellbore that seals against and adheres to the tubular and the sidewall to form sealing and adhering interfaces between the set cement and both of the tubular and sidewall, where the capsules are configured to increase an elasticity of the set cement, so that when one of the tubular or sidewall are displaced, the set cement correspondingly undergoes deformation to retain the sealing and adhering interfaces. In an example, the polymeric shells make up from about 3 percent by weight of the cement to about 5 percent by weight of the cement. Optionally, the deformation of the set cement causes a stress at a threshold magnitude that ruptures at least some of the polymeric shells to form spent capsules. In this example, the presence of the spent capsules in the set cement continues to impart beneficial mechanical property, such as further increases elasticity of the set cement. In an alternative, the encapsulant is released from at least some of the polymeric shells by osmosis, and where the empty polymeric shells form spent capsules. The encapsulant can include a signaling agents such as colored dyes, fluorophore, isotopes, fluorescent dyes, fluorescein, and combinations thereof. The method optionally further includes monitoring the presence and concentration of the signaling agent that releases from the polymeric shells. In one alternative, the encapsulant is a cement sealing reagent, so that the capsules house the sealing reagent, but when sheared open from microannuli formation in the cement, the release of these sealing reagents form a seal to mitigate formation fluid travel to the surface or pressure build up. In an embodiment, the triggered-release sealing reagents form a seal to fix cracked cement. In an embodiment, the capsules are formed by combining a first fluid with a second fluid that is immiscible with the first fluid and that contains a second reagent that is combinable with first reagent in the first fluid to form the polymeric shells. Alternatively, the first and second reagents include compounds having a reactive functional group made up of monomers with tri-functional acid chlorides and monomers with di-functional amino groups. A characteristic of the polymer shells can be controlled by adjusting a concentration of a one of the first and second reagents, where the characteristics can be permeability and yield strength. A release rate of the substance from the polymer shells can be controlled by adjusting one or more of, a viscosity of the first fluid, a permeability of the polymer layers, a size of the reagents, and a charge of the reagents.

Another method of wellbore operations includes combining a first solution with a second solution, the first solution having a first fluid and a first reagent, the second solution having a second fluid that is immiscible with the first fluid, and a second reagent that is combinable with the first reagent to form capsules that each include an elastomeric shell encapsulating a portion of a one of the solutions, and strategically controlling a concentration of one of the first or second reagents to vary a characteristic of the elastomeric shell, so that when the capsules are combined with a cement slurry that is then cured in a wellbore to form a set cement, an elasticity of the set cement is increased. The solution in the capsules is optionally released over time to form spent capsules, where the spent capsules continue to impart beneficial properties, such as elasticity to the set cement. An example characteristic of the elastomeric shell includes a yield strength of the elastomeric shell.

Also disclosed herein is cement for use in a wellbore that includes a cementitious material that is flowable when mixed with a liquid and pumped into the wellbore, and capsules that have an encapsulant encased in a polymer shell, the capsules strategically formed to increase an elasticity of set cement, so that when the cement is bonded to a surface in the wellbore, the cement deforms in response to movement of the surface and retains the bond to the surface. In one example, the surface is a surface of a downhole tubular, or a surface of a sidewall of a wellbore. The polymer shells optionally make up about 3 percent by weight of the cementitious material to about 5 percent by weight of the cementitious material. The polymer shells are optionally strategically designed to rupture when subjected to a designated magnitude so that the encapsulant is released from the capsule to define spent capsules in the cement, and wherein the spent capsules increase the elasticity of the cement.

BRIEF DESCRIPTION OF DRAWINGS

Some of the features and benefits of the present improvement having been stated, others will become apparent as the description proceeds when taken in conjunction with the accompanying drawings, in which.

While the improvement will be described in connection with the preferred embodiments, it will be understood that it is not intended to limited to these embodiments. On the contrary, it is intended to cover all alternatives, modifications, and equivalents, as may be included within the spirit and scope as defined by the appended claims.

DETAILED DESCRIPTION

The method and system of the present disclosure will now be described more fully in the following text with reference to the accompanying drawings in which embodiments are shown. The method and system of the present disclosure may be in many different forms and should not be construed as limited to the illustrated embodiments set forth here; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
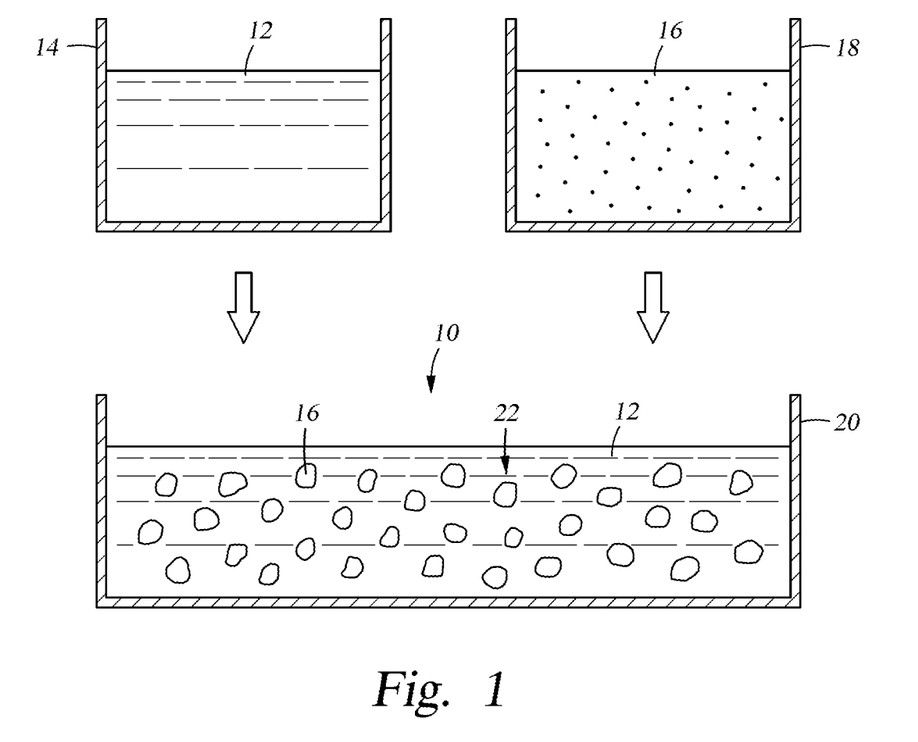
FIGS. 1 and 2 are schematic side sectional views of an example of forming capsules for use in wellbore cement.

FIG. 1 shows in schematic form one example of a step of forming an emulsion 10. Here, a first fluid 12 from a first container 14 and a second fluid 16 from a second container 18 are combined in a third container 20. In this example, the first and second fluids 12, 16 are immiscible with respect to one another, and which form the emulsion 10 combined in the third container 20. In the illustrated embodiment, the second fluid 16 polymerizes at interfaces between the two immiscible fluids to form vesicles 22 within the first fluid 12. The vesicles 22 define a dispersed phase, and the first fluid 12 defines a continuous phase. The vesicles 22 contain primarily the contents of the second fluid 16. Examples exist where the emulsion 10 is a water and oil emulsion, an oil and water emulsion, an oil and oil emulsion, or a water and water emulsion. Further in the example, the first and second fluids 12, 16 are water or oil, and where monomer reagents are dispersed into each of the fluids 12, 16. In an alternative, hollow fibers are formed in the emulsion 10 by controlling mixing speed in the container 20 so that flow is laminar.

In an optional example, the fluids 12, 16 are made up of a combination of solvents and reagents. In an alternate example, the first fluid 12 contains a polar solvent, whereas the second fluid 16 contains a non-polar solvent, and optionally, first fluid 12 contains a non-polar solvent and the second fluid 16 contains a polar solvent. In an example the polar solvent includes water and the non-polar solvent includes a hydrocarbon substance such as an oil, chloroform, cyclohexane, a mix of chloroform and cyclohexane, and including combinations. In the example of FIG. 1 a signaling agent is optionally included within the second fluid 16.

Figure 2:
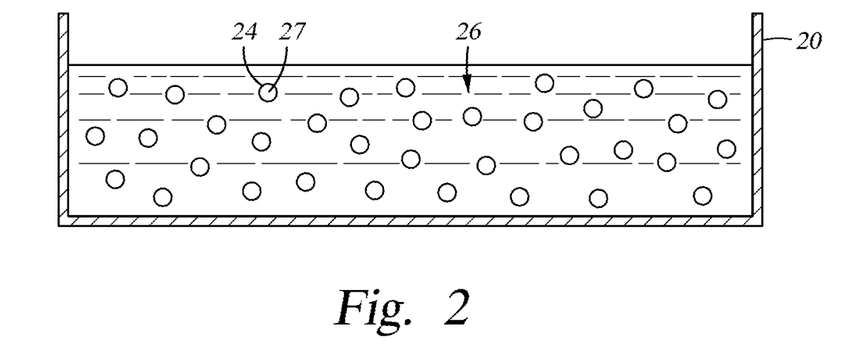

Referring now to FIG. 2, illustrated in a side partial sectional view is a schematic example of polymer membranes 24 being formed along the interfaces between the dispersed and continuous phases and that border the vesicles 22 (FIG. 1). In the illustrated example, the first and second fluids 12, 16 each contain separate reagents that when combined produce the polymer membranes 24 that form outer layers of the vesicles 22. The polymer membranes 24 covering the substances the vesicles 22 each define a capsule 26. The substances in the vesicles 22 then define an encapsulant 27 within the membranes 24. Examples of the different reagents making up the first and second fluids 12, 16 include monomers with multiple functional reactive groups, such as acid chlorides that react with monomers having di-functional amino groups that form amide bonds. In an embodiment, the monomers include aromatic compounds having multi-functional reactive groups. Optionally, reacting the multifunctional monomers produce polyamide and polyaramide membranes that make up a polyamide shell, which is one example of the polymer membrane 24. Shown in Table 1 are example reactions for forming the polymer membrane 24. In an example, the monomers in Table 1 undergo a condensation polymerization reaction to form amide bonds. Example times for the polymerization reaction range from 60 minutes to about 24 hours. Capsules 26 are optionally produced under high shear conditions.

TABLE 1

Reference numerals are assigned to the chemical compounds provided in Table 1 and where the names of the chemicals with the assigned reference numerals are: (1) 1,3,5-benzenetricarboxylic acid chloride; (2) sebacoyl chloride; (3) ethylenediamine; (4) 1,4-diaminobenzene; (5) 1,3-diaminobenzene; (6) 1,6-diaminohexane; (7) poly(ethylene trimesoylamide); (8) poly-(para-phenylene trimesoylamide); (9) poly-(meta-phenylene trimesoylamide); (10) poly(hexamethylene trimesoylamide); and (11) poly(hexamethylene-co-sebacoyl trimesoylamide).

In the example of Table 1, the reactive monomers are classified as Monomer A, Monomer B, and Co-monomer A. Monomer A is depicted as 1,3,5-benzenetricarboxylic acid chloride, but in an embodiment is any compound having multi-functional reactive groups, and being in the range of C8-C12 or more. In an alternative, Monomer A is aromatic, cyclic, or linear. Examples of Monomer B provided in Table 1 are compounds with di-functional amide groups, where the compounds include aromatic and linear organic compounds. In an alternative, Monomer B includes cyclic organic compounds with multi-functional amide or amine groups. Examples exist where compounds making up Monomer B range from C2-C8 or more. In an alternate embodiment, a Co-monomer A, shown in Table 1 as sebacoyl chloride, is used in conjunction with Monomer A. Alternatively, Co-monomer A includes a cyclic or aromatic compound with multiple function reactive groups. In one non-limiting example, Monomer A and Monomer B are disposed in separate ones of the first and second fluids 12, 16 prior to those fluids 12, 16 being combined. Optionally, Co-monomer A is included in the same fluid as Monomer A.

In an embodiment, a molar ratios of the reactive sites of Monomer A and Monomer B is 1:1. In an exemplary embodiment a molar ratios of the reactive sites of Monomer A and Co-monomer A is 1:1. It is within the capabilities of those skilled in the art to determine molar ratios of the monomers and co-monomer. In one embodiment, a monomer that is more aliphatic is used for producing a flexible polymer, and a monomer that is more aromatic is used for producing a rigid polymer. In another embodiment, a cross linker, such as monomer A, is used to control membrane characteristics such as permeability and strength. Alternatively, carboxylic acids instead of carboxylic chlorides (or any halogen) are used to react with an amine. Embodiments exist where a polycondensation reaction is used for interfacial polymerization between two immiscible liquids. In one example, the high strength and heat resistance of polyamides provide advantages when used in a polycondensation reaction. In an alternative embodiment, the class of compounds from which monomers A, B, and co-monomer A are selected are for polycondensation (step-growth) reactions. Organic bases include alcohol and amine, and organic acids include carboxylic acid, acid chlorides, with the elimination of small organic molecules (water or HCl). This can include up to four different types of reactions besides polyamides, as shown here, such as: polyesters, polyurethanes, and polyureas.

In one example, the compound having the tri-functional reactive acid chlorides is referred to as a cross linker. In an alternative, the cross linker defines a reagent or compound having more functional reactive groups than another reagent or compound being reacted with the cross linker to form a polymer. It has been discovered that varying the concentrations of the cross linker is a way to control the permeability and strength of the polymer membrane 24. In an alternate example, the release rate of the signaling agent from a capsule 26 is controlled by: (1) changing the viscosity of the dispersed phase within the emulsion 10; (2) changing the permeability of the polymer membrane 24, (3) changing the size and charge of the reagents used to form the polymer membrane 24; or (4) selective combinations of these. In one example, the "release rate" of the signaling agent defines a quantity of signaling agent being released from the membrane 24 over time. Optionally, altering a mixing speed used for combining the first and second fluids 12, 16 within the container 20 controls sizes of the capsules 26. Example encapsulants 27 include sealing reagents, such as polymer, salt, rubber, water, any compounds or substances that self-seal fractured cement, cement additives, gas scrubbers, anti-gas migration additives, and combinations thereof.

In a non-limiting example, magnitudes of permeability values of the polymer 24 change with variances in an amount of cross linker (and the addition of a co-monomer) included in a reaction to form the polymer 24. In one embodiment, decreasing an amount of cross linker in the polymer 24, increases permeability of the polymer 24, which will therefore release more encapsulant 27 from within the capsule 26. In another embodiment, increasing an amount of cross linker in the polymer 24, decreases permeability of the polymer 24, and increases yield strength of the polymer 24. In this embodiment, decreasing an amount of cross linker forms a more permeable polymer 24, and resulting capsules 26 release more encapsulant 27 than those formed from less permeable polymer 24 formed with a greater amount of cross linker. In an alternative, changing permeability of the polymer 24 alters a release rate of signaling agents from a capsule 26 formed with the polymer 24—thus an amount of cross linker used in forming the polymer 24 affects the release rate of signaling agent from the resulting capsule 26. Alternatively, anchoring polymers are included to reduce the release rate. Further in this embodiment, decreasing the amount of cross linker forms a weaker polymer 24, and the resulting capsules 26 burst or rupture under a lower applied stress/force than capsules 26 formed with a stronger polymer 24 formed with a greater amount of cross linker. Conversely, examples exist where a less permeable and stronger polymer 24 is produced when larger amounts of cross linker are used to form the polymer 24, and which forms capsules 26 that release less encapsulant 27, and that withstand greater stress/force before being ruptured. In some embodiments, yield strength of the polymer 24 increases with an increased time of reaction of the reactants that form the polymer 24. In an example embodiment, capsules 26 are formed that thermally decompose at around 350° C.

Figure 3A:
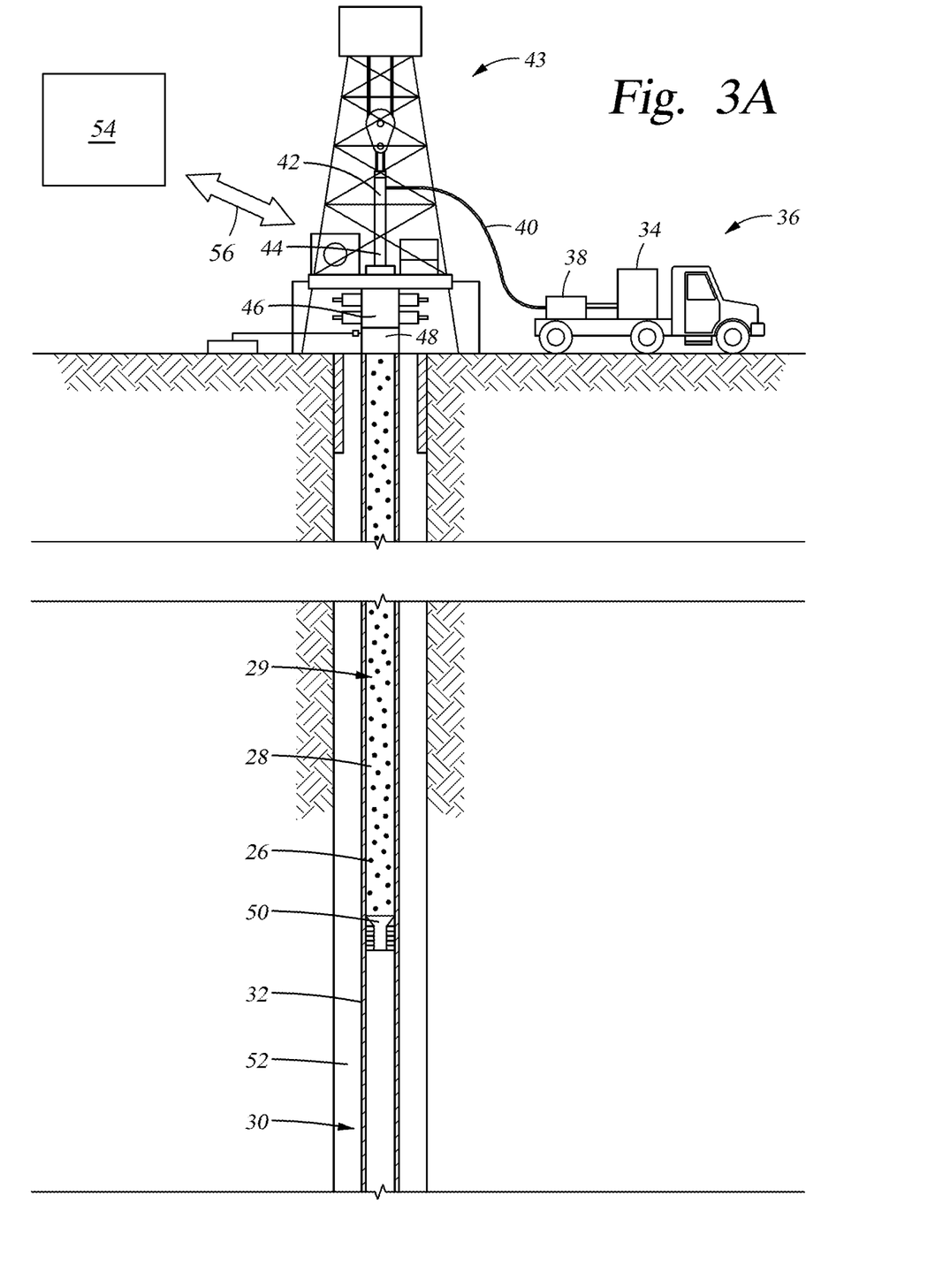
FIGS. 3A and 3B are side partial sectional views of an example of cementing a wellbore with cement having capsules.
Figure 3B:
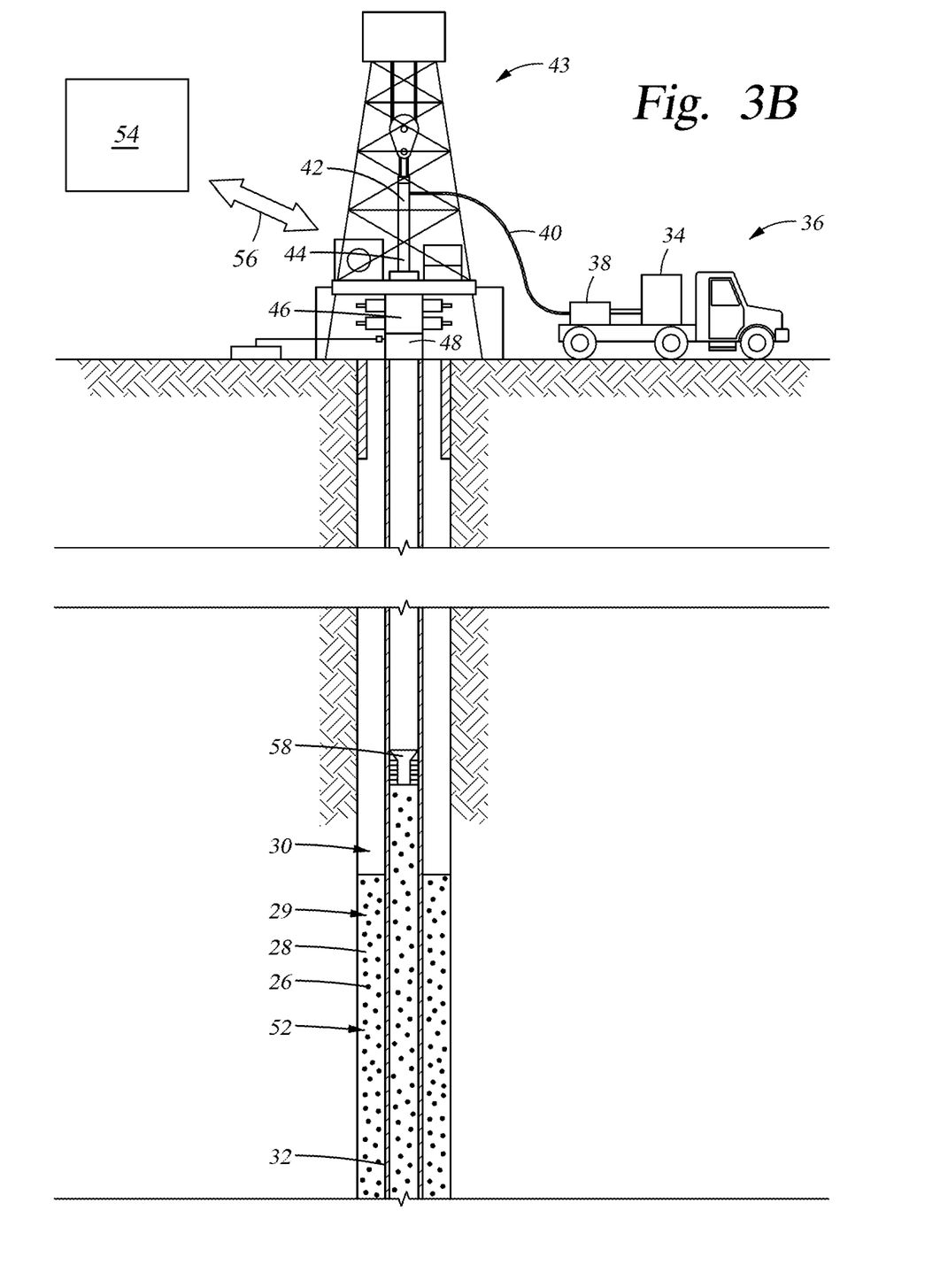

Shown in a side partial sectional view in FIGS. 3A and 3B is an example of injecting a slurry 29 of cement 28 with the capsules 26 (FIG. 2) into a wellbore 30. Examples exist where an amount of the capsules 26 in the slurry 29 is about 3 percent by weight of the cement 28 in the slurry 29, about 5 percent by weight of the cement 28 in the slurry 29, and all values between. Optionally, the amount of capsules 26 in the slurry 29 is such that the material of the polymer membranes 24 in the capsules 26 is about 3 percent by weight of the cement 28 in the slurry 29, about 5 percent by weight of the cement 28 in the slurry 29, and all values between. As shown in FIG. 3A, a column of the slurry 29 is being injected into an annular casing 32 inserted within the wellbore 30. In an embodiment the cement 28 is a dry particulate matter used as a base material for a composition that bonds the casing 32 to the wellbore 30. Specific examples of the cement 28 include Portland cement, further embodiments exist where the cement includes tri-calcium silicate and di-calcium silicate. The slurry 29 is formed by mixing the dry cement 28 with a liquid, such as water, and other additives. The slurry 29 is stored in a tank 34 shown mounted on a cement truck 36 on surface. A cement pump 38 pressurizes the slurry 29, from where it is discharged into a line 40 which carries the slurry 29 to a cement head 42 that is mounted within a surface rig 43. Example methods of forming the capsules 26 include applying a high shear during synthesis, which insures enough strength to the polymer 24 so the capsules 26 do not rupture when being pressurized by the cement pump 38. The cement head 42 mounts onto a pipe 44 that directs the pressurized slurry 29 to a blowout preventer ("BOP") 46 shown set on a wellhead assembly 48. A main bore (not show) axially intersects the BOP 46 and wellhead assembly 48, and through which the slurry 29 flows to within the casing 32. An optional wiper plug 50 is shown on the lower end of the column of slurry 29, which has an outer diameter in contact with and that removes foreign matter from the inner surface of the casing 32 as the column of slurry 29 urges the plug 50 through the casing 32. Further, drilling mud or other fluid (not shown) standing within the casing 30 is pushed downward by the slurry 29 and plug 50 and past the lower terminal end of the casing 32 and into an annulus 52 between the casing 32 and sidewalls of the wellbore 30. Further illustrated in FIGS. 3A and 3B is a controller 54 for monitoring operations of the truck 36 and rig 43, and via the communication means 56 receives signals from the equipment shown on surface or within the wellbore 30. In an embodiment, controller 54 also transmits signals to the equipment via communication means 56. Examples of the communication means 56 include electromagnetic waves, electrically conducting material, fiber optics, and combinations thereof.

Referring now to the example of FIG. 3B, shown in a side partial sectional view is one example of disposing cement 28 and capsules 26 in the annulus 52 between the casing 32 and sidewalls of the wellbore 30. An upper plug 58 is shown disposed within casing 32 at the upper end of the column of slurry 29. In the illustrated example, the upper plug 58 is inserted into the casing 32 after a designated amount of the slurry 29 was injected into the wellbore 30. Further in this example, displacement fluid (not shown) is pumped into the wellbore 30 above the upper plug 58, which urges plug 50 (FIG. 3A) into a cement shoe (not shown) disposed at the bottom of the well and lower terminal end of casing 32. A rupture disk (not shown) within plug 50 opens at a designated pressure, thereby allowing communication across the plug 50. After the set pressure in the rupture disk is reached, the slurry 29 (with cement 28 and capsules 26) flows through plug 50 and past the lower terminal end of the casing 32. An opening at the lower end of casing 32 allows a flow of slurry 29 back upwards into the annulus 52 between the casing 32 and sidewalls of the wellbore 30.

Figure 4:
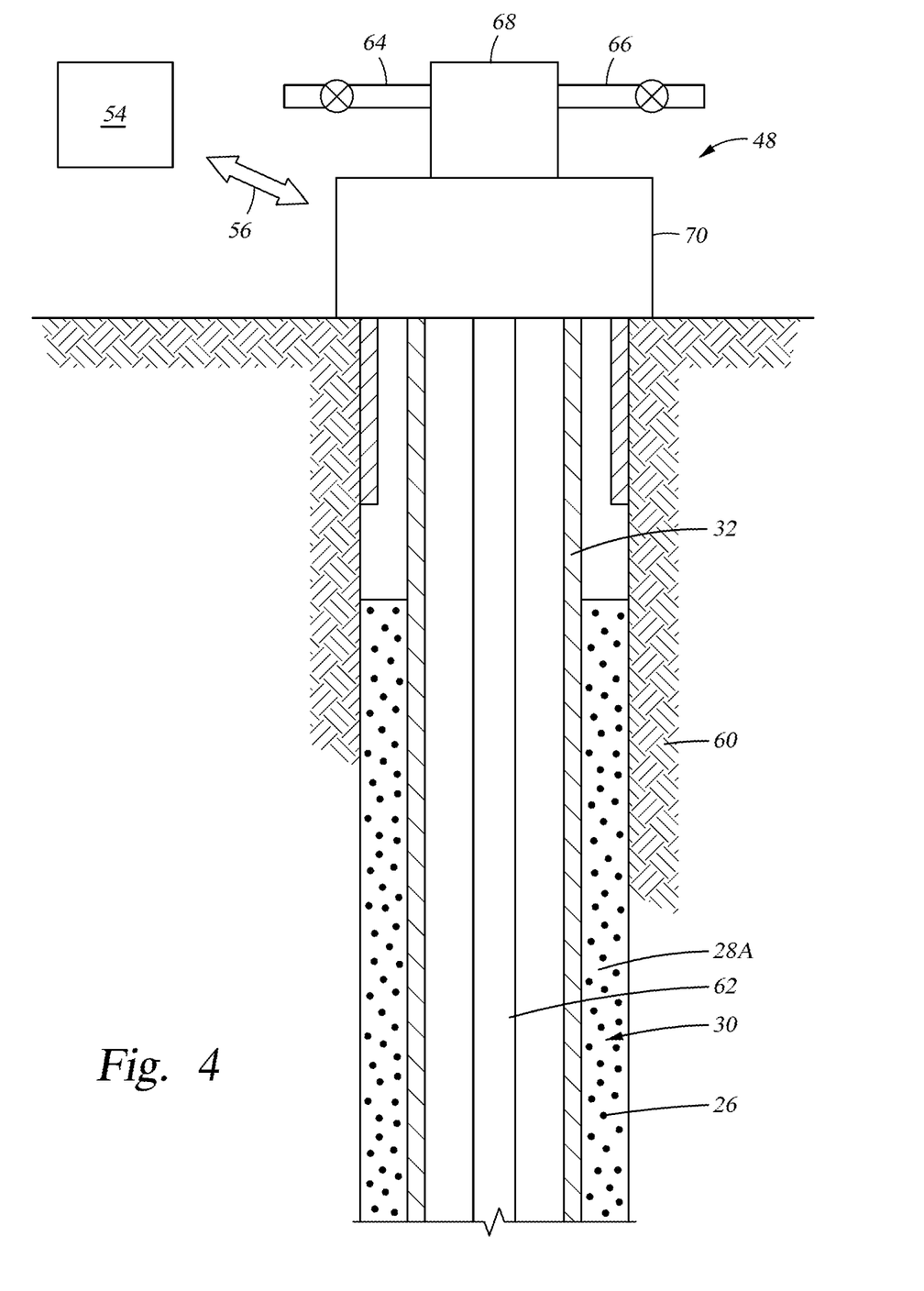
FIG. 4 is a side partial sectional view of an example of operation the wellbore of FIGS. 3A and 3B.

Depicted in FIG. 4 is a side partial sectional view of an example of producing fluid from the formation 60 surrounding the wellbore 30. Here the cement 28 of FIGS. 3A and 3B has hardened and cured to form a set cement 28A that is substantially non-flowable, and which includes capsules 26 embedded within. In an example, the step of hardening and curing the cement 28 to form set cement 28A is substantially the same as that of neat cement that contains no capsules 26. The set cement 28A adheres the casing 32 to sidewalls of the wellbore 30 and isolates zones at different depths in the formation 60 from one another. The set cement 28A having the capsules 26 is more elastic than that of a set cement (not shown) without capsules 26 dispersed within. Moreover, the set cement 28A with the capsules 26 has a Young's modulus and a shear modulus that is less than that of set cement without the capsules 26. Production tubing 62 is shown inserted within the casing 32, and in which the produced fluid is directed to the wellhead assembly 48 on surface. The wellhead assembly is equipped with production lines 64, 66 shown attached to a production tree 68, and which selectively convey produced fluid away from the wellsite. The production tree 68 is shown attached to a wellhead housing 70, which mounts on an opening of the wellbore 30. As described in more detail below, in an embodiment capsules 26 are strategically formed to selectively collapse or otherwise fracture when subjected to a designated pressure or temperature; which causes the signaling agents to be released from within the capsules 26. Alternatively, the signaling agents migrate through the polymer membranes 24 (FIG. 2), such as through osmosis. In this example, sensors (not shown) are set in the wellbore 30 or mounted to wellhead assembly 48 and that monitor the presence of the signaling agents released from the capsules 26 that have migrated upward to surface. Examples of signaling agents include dye, a fluorophore, isotopes, and combinations thereof. Sensors are optionally in communication with controller 54 via communication means 56.

Figure 5:
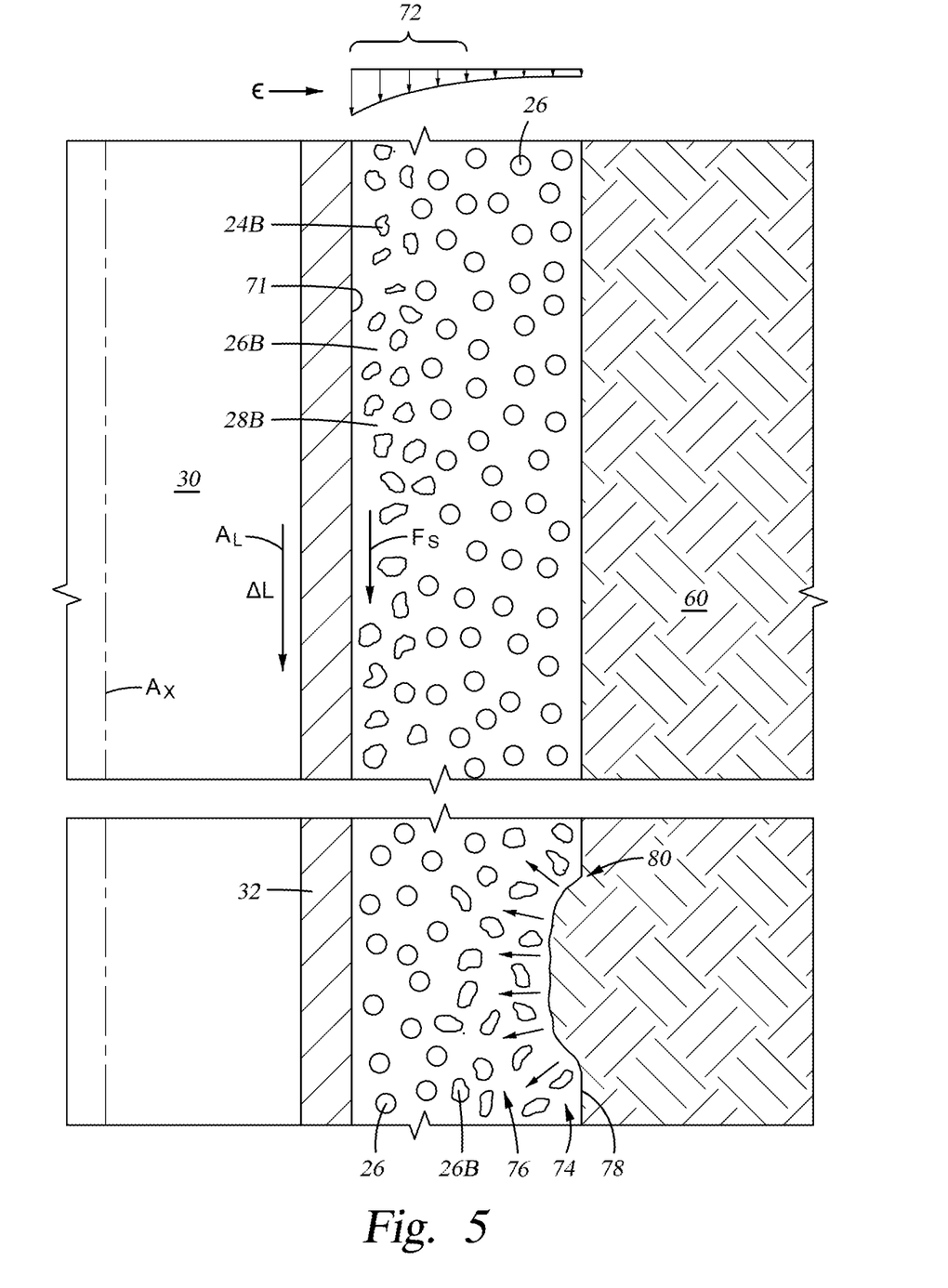
FIG. 5 is a side partial sectional view of an enlarged portion of FIG. 4, where some of the capsules are spent but remain intact or have ruptured.

Shown in a side sectional view in FIG. 5 are examples of polymer membranes 24B within set cement 28B that are void of their encapsulated substances (such as the signaling agents). Without the encapsulated substances, the polymer membranes 24B collapse to form spent capsules 26B. As indicated above, the encapsulant 27 escapes the polymer membranes 24B when the membranes 24B rupture, or by permeating through the membranes 24B in an osmosis type action. Embodiments exist where the polymer membranes 24B rupture in either or both pf slurry wet or hard set cements; thus in either of these phases the capsules/vesicles deliver the encapsulant 27, but as the cement sets, the spent capsules 26B still impart beneficial mechanical properties to the set cement 28A. In an optional embodiment, a set cement 28B with spent capsules 26B embedded within has characteristics or properties that differ from a set cement 28A (FIG. 4) having capsules 26 (FIG. 2) that are made up of polymer membranes 24 with encapsulated substances. Examples of differing characteristics or properties include Young's modulus, shear modulus, toughness, and ductility. Further in this embodiment, the set cement 28A with spent capsules 26B has a Young's modulus and shear modulus less than that of a set cement without added components such as capsules 26 or spent capsules 26B. In the example of FIG. 5, the spent capsules 26B in the set cement 28B increase the elastic properties of the set cement 28B so that the set cement 28B conforms to the casing 32 and inner surface of wellbore 30.

Increased elasticity, toughness, or ductility of the set cement 28B also enables the cement 28B to elastically yield in response to movement of the casing 32 or changes in the formation 60 that affect the shape or contour of the wellbore 30. In the example of FIG. 5, casing 32 is shown undergoing an elongation $\Delta L$ in a direction represented by arrow $A_L$. Example causes of the elongation $\Delta L$ include thermal expansion from exposure to high temperature fluids, and creep from being suspended in the wellbore 30. The elongation $\Delta L$ of the casing 32 generates a shear force $F_S$ shown applied tangentially to an interface 71 between the casing 32 and set cement 28B. The shear force $F_S$ transfers to the set cement 28B and produces a localized strain in a portion of the set cement 28B; the magnitude of the strain c is graphically illustrated, and which reflects maximum values proximate the interface 71. The portion of the set cement 28B experiencing strain is in a shear zone 72. In the illustrated embodiment the localized strain generates stress in the portion of the set cement 28B at least within the shear zone 72. When the stress in the set cement 28B exceeds a threshold magnitude, capsules 26 in the shear zone 72 rupture and form spent capsules 26B. The spent capsules 26B and capsules 26 in the set cement 28B increase the elasticity of the set cement 28B allowing the set cement 28B to stretch in response to the elongation of the casing 32. The increased ductility of set cement 28B enables it to continuously adhere to and seal along an interface 71 between the set cement 28B and casing 32. The threshold magnitude, which in one example has units of force per area, is the value of a stress or pressure that when applied to the capsules 26 causes the capsules 26 to rupture, thereby forming the spent capsules 26B. As indicated above, the threshold magnitude is controlled with strategic changes in the formation of the capsules 26, such as a relative amount of the cross linker reactant. It is within the capabilities of those skilled in the art to form capsules having a designated threshold magnitude without, and without undue experimentation.

Advantages of the present description are also realized with changes to the shape of the wellbore 30. Further illustrated in the example of FIG. 5, a bulge 74 is shown in the formation 60 that formed at a point in time after the slurry 29 was added to the wellbore 30 and cured to form the set cement 28B. As shown, the bulge 74 protrudes radially inward towards an axis $A_X$ of wellbore 30 to create compressional forces $F_C$ within the set cement 28B adjacent the bulge 74. Similar to how the shear force $F_S$ discussed above generated stress in the shear zone 72, a compression zone 76 is defined in the space where stresses are applied to the capsules 26 resulting from the compressional forces $F_C$. At least some of the capsules 26 in the compression zone 76 are subjected to compressional forces $F_C$ that exceed the threshold magnitude, and rupture in response to the applied stress. Spent capsules 26B are formed by rupturing the capsules 26, which releases the substances encapsulated within the polymer membranes 24B. Because the set cement 28B has increased elasticity and pliability due to inclusion of the capsules 26 and spent capsules 26B, deformation of the set cement 28B created by the bulge 74 does not interrupt the sealing and adhering contact between the set cement 28B and sidewall 78 of the wellbore 30. A seal and a bond therefore remain along an interface 80 between the set cement 28B and sidewall 78. Accordingly, increasing the elasticity, toughness, or ductility of the set cement 28B, such as with the capsules 26 and spent capsules 26B, reduces or eliminates the presence of micro-annuli or cracks in the set cement 28B. Thus the elastic set cement 28B continues to conform to the casing 32 and sidewall 78 of the wellbore 30 over time, and also with movement of the casing 32 and sidewall 78. Further optionally, the concentration of cross linking agents discussed above can be adjusted to alter characteristics of the spent capsules 26B and the set cement 28B.

The present improvement described here, therefore, is well adapted to carry out the objects and attain the ends and advantages mentioned, as well as others inherent. While certain embodiments have been given for purposes of disclosure, numerous changes exist in the details of procedures for accomplishing the desired results. In one example, the capsules 26 rupture in response to a combination of a designated temperature and pressure. Alternative examples exist where signaling agent is released through osmosis from the capsules 26 while in fluid, and the capsules 26 rupture after being set in a solid, such as cement. These and other similar modifications will readily suggest themselves to those skilled in the art, and are intended to be encompassed within the spirit of the present improvement disclosed here and the scope of the appended claims.

What is claimed is:

1. A method of wellbore operations comprising:
    forming capsules comprising an encapsulant encased within polymeric shells by a polycondensation reaction in which a first reagent of a first fluid is polymerized with a second reagent of a second fluid, the second fluid being immiscible within the first fluid;
    controlling permeability of the polymeric shells by adjusting concentrations of the first and second reagents so that the polymeric shells are permeable by the encapsulant, and the encapsulant is released from the polymeric shells by osmosis;
    forming a slurry comprising a cement and the capsules;
    urging the slurry into an annular space between a sidewall of the wellbore and a tubular in the wellbore;
    curing the slurry in the wellbore to create a set cement in the wellbore that seals against and adheres to the tubular and the sidewall to form sealing and adhering interfaces between the set cement and both of the tubular and sidewall, and in response to displacement of one of the tubular or sidewall, the set cement correspondingly undergoes deformation to retain the sealing and adhering interfaces; and
    monitoring the wellbore for the release of the encapsulant from the capsules.

2. The method of claim 1, controlling a release rate of the encapsulant from the polymeric shells by changing a viscosity of one of the first or second fluids.

3. The method of claim 1, wherein the deformation of the set cement causes a stress in the set cement, wherein the stress at a threshold magnitude ruptures at least some of the polymeric shells to form spent capsules.

4. The method of claim 3, wherein the presence of the spent capsules in the set cement further increases elasticity of the set cement.

5. The method of claim 1, where the encapsulant is released from the polymeric shells by osmosis to form empty polymeric shells, and where the empty polymeric shells form spent capsules.

6. The method of claim 1, where the encapsulant comprises a signaling agent selected from the group consisting of colored dyes, fluorophore, isotopes, fluorescent dyes, fluorescein, and combinations thereof.

7. The method of claim 6, further comprising monitoring the presence and concentration of the signaling agent that releases from the polymeric shells.

8. The method of claim 1, where the encapsulant comprises a cement sealing reagent.

9. The method of claim 1, where interfacial polymerization occurs between the first and second reagents.

10. The method of claim 9, where the first and second reagents comprise compounds having a reactive functional group and are selected from the group consisting of monomers with tri-functional acid chlorides and monomers with di-functional amino groups.

11. The method of claim 9, where the first reagent further comprises sebacoyl chloride.

12. The method of claim 9, further comprising controlling a release rate of the encapsulant from within the polymeric shells by the adjusting of the concentrations of the first and second reagents.

13. The method of claim 1, where the polymeric shells comprise a polymer selected from the group consisting of poly(ethylene trimesoylamide), poly-(para-phenylene trimesoylamide), poly-(meta-phenylene trimesoylamide), poly (hexamethylene trimesoylamide), and poly(hexamethylene-co-sebacoyl trimesoylamide).

\* \* \* \* \*